United States Patent
Creamer et al.

(10) Patent No.: US 7,882,398 B2
(45) Date of Patent: Feb. 1, 2011

(54) GHOST AGENTS WITHIN A GRID ENVIRONMENT

(75) Inventors: Thomas E. Creamer, Boca Raton, FL (US); Bill H. Hilf, La Habra, CA (US); Neil A. Katz, Parkland, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 11/945,093

(22) Filed: Nov. 26, 2007

(65) Prior Publication Data

US 2009/0119544 A1 May 7, 2009

Related U.S. Application Data

(63) Continuation of application No. 10/665,582, filed on Sep. 19, 2003, now Pat. No. 7,337,363.

(51) Int. Cl.
*G06F 11/00* (2006.01)
(52) U.S. Cl. .................................................. 714/38
(58) Field of Classification Search ................... 714/25, 714/28, 31, 33, 38; 709/202, 224; 363/42; 718/105, 100; 717/127
See application file for complete search history.

(56) References Cited

U.S. PATENT DOCUMENTS

| | | | |
|---|---|---|---|
| 5,592,609 A | 1/1997 | Suzuki et al. | |
| 5,935,006 A | 8/1999 | Nakajima | |
| 6,024,643 A | 2/2000 | Begis | |
| 6,122,664 A | 9/2000 | Boukobza et al. | |
| 6,419,577 B1 | 7/2002 | Okada et al. | |
| 2002/0002074 A1 | 1/2002 | White et al. | |
| 2004/0139202 A1* | 7/2004 | Talwar et al. | 709/229 |
| 2005/0065766 A1 | 3/2005 | Creamer et al. | |
| 2005/0066025 A1 | 3/2005 | Creamer et al. | |
| 2005/0076191 A1 | 4/2005 | Creamer et al. | |
| 2005/0240777 A1* | 10/2005 | Keohane et al. | 713/185 |
| 2006/0195559 A1* | 8/2006 | Winter et al. | 709/223 |

* cited by examiner

*Primary Examiner*—Ronald Laneau
(74) *Attorney, Agent, or Firm*—Novak Druce + Quigg LLP

(57) ABSTRACT

A method for evaluating system behavior within a grid environment can include the step of identifying a host software object, wherein the host software object includes a user object, an application, and/or a process. The software object can be associated with the host software object. The host actions of the host software object can be replicated within the associated software object. Replicated actions can be recorded. The host software object can move from one grid within the grid environment to a different grid. In response to the moving of the host software object, the associated software object can move from the one grid to the different grid.

18 Claims, 3 Drawing Sheets

GHOST AGENTS WITHIN A GRID ENVIRONMENT

CROSS REFERENCE TO RELATED APPLICATIONS

This application is a continuation of, and accordingly claims the benefit from, U.S. patent application Ser. No. 10/665,582, now issued U.S. Pat. No. 7,337,363, which was filed in the U.S. Patent and Trademark Office on Sep. 19, 2003.

BACKGROUND OF THE INVENTION

1. Technical Field

The present invention relates to the field of computer software and, more particularly, to process tracking and recordation within a grid environment.

2. Description of the Related Art

A grid computing environment is a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

The concept of grid computing is intertwined with the concept of autonomic computing. That is, autonomic computing refers to computing systems that run themselves and are capable of high-level functioning while keeping the system's complexity invisible to human operators. Grid computing, on the other hand, can provide computing capacity and resources while obscuring from the consumer the machine-dependent details relating to the hardware that provides the computing capacity and resources.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D₂OL), and EUROGRID. Additionally, commercially available software products exist for establishing a customizable grid computing environment, such as Avaki's data grid from Avaki of Burlington, Maine and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

One problem with existing grid computing environments relates to the logging or recordation of events. More specifically, within a grid environment, computer processes, applications, and users can utilize computing resources from many different hardware sources disposed across several computing grids. Therefore, no common location exists for logging system information. Without accurate system logs, system designers and administrators cannot determine which computing resources are consumed by individual computer processes, applications, and users. Accordingly, testing new grid applications, equitably allocating grid computing resources among a set of consumers, and maintaining computing grids can be exceptionally difficult.

SUMMARY OF THE INVENTION

The invention disclosed herein provides a method, a system, and an apparatus for establishing and utilizing ghost agents within a grid environment. A ghost agent is a software object that can be associated with a host software object, such as a user object, an application, and/or a process. The ghost agent can replicate the actions of the host software object and follow the host software object whenever the host software object moves in the grid environment. As used herein, movement in a grid environment refers to the movement from one grid component to another component within a grid and/or movement from one grid to a different grid of the grid environment. The replicated actions can be recorded, thereby establishing a log for the activities of the host software object. The logs for individual ghost agents can be conveyed to a centralized ghost log repository and used to characterize the usage of computing resources within a grid environment.

One aspect of the present invention includes a method for evaluating system behavior within a grid environment. The method can identify a host software object and associate a software object with the host software object. The associated software object can be referred to as a ghost agent. The host software object can include a user object, an application, and/or a process. Host actions can be replicated within the associated software object and recorded for logging purposes. The replicated actions can be passive actions that are prevented from executing in the grid environment. Additionally, the host software object can generate a new action, which can be replicated within the associated software object. The host software object can move within the grid environment. In response to the moving of the host software object, the associated software object can move within the grid environment.

In one embodiment, a multitude of host software objects can be selected, wherein the multitude of host software objects can include a statistically relevant number for determining behavior of the grid environment. For each selected host software object, a software object can be associated. This associated software object can replicate and record the actions of the host software object. Behavior of at least a part of the grid environment can be modeled using data obtained from the associated software objects.

The associated software object can be disassociated from the host software object and transferred to a different host software object. Alternatively, the associated software object can be cloned to create a copied object. This copied object can be associated with a different host software object.

In another embodiment, the associated software object can be authenticated within the different grid space. That is, an associated object can identify itself to security components of a new grid space and subsequently be granted access privileges to the new grid space. Once authenticated, the associated software object can automatically enter the different grid space. A location for logging data that is external to the associated software object can also be determined. The recorded replicated actions can be conveyed to the determined location.

In yet another embodiment, the host software object can represent a user object. When the user object is transferred from one grid to another, the associated software object can be responsively transferred from the original grid to the different grid. Further, the user object can represent a player of a distributed multi-player gaming system. In such a case, the actions within the gaming system taken by a user represented by the user object can be recorded.

Another aspect of the present invention includes a system for logging information within a grid environment. The system includes a host software object configured to execute actions within the grid environment. Notably, the host software object can move among different grids of the grid environment. Further, the system can include a ghost agent configured to log actions executed by the host software object. The ghost agent can be further configured to move among different grids of the grid environment to follow movement of the host software object. The host software object can represent a user, an application, and/or a process. The system can include a ghost log repository, which can include a data store configured to receive log messages from one or more ghost agents. The system can also include a ghost-enabled grid controller configured to grant ghost agents access to grid resources. For example, the ghost-enabled grid controller can utilize policy-based controls to manage permissions, authenticate ghost agents, control resource utilization, and perform security related functions.

Yet another aspect of the present invention can include a ghost agent that can automatically move from grid to grid within a grid environment responsive to predetermined conditions relating to a host software object. The ghost agent can include a ghost log configured to record activities of the host software object. The ghost agent can also include a ghost identifier configured to identify the ghost agent to components within the grid environment, such as grid and network management and security systems. Further, the ghost agent can include a ghost controller for managing interactions between the ghost agent and components external to the ghost agent. The ghost agent can include a means for linking the ghost agent with the host software object. Additionally, the ghost agent can include a means for disassociating the ghost agent from the host software object and a means for linking the disassociated ghost agent to a different host software object.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

Figure 1:
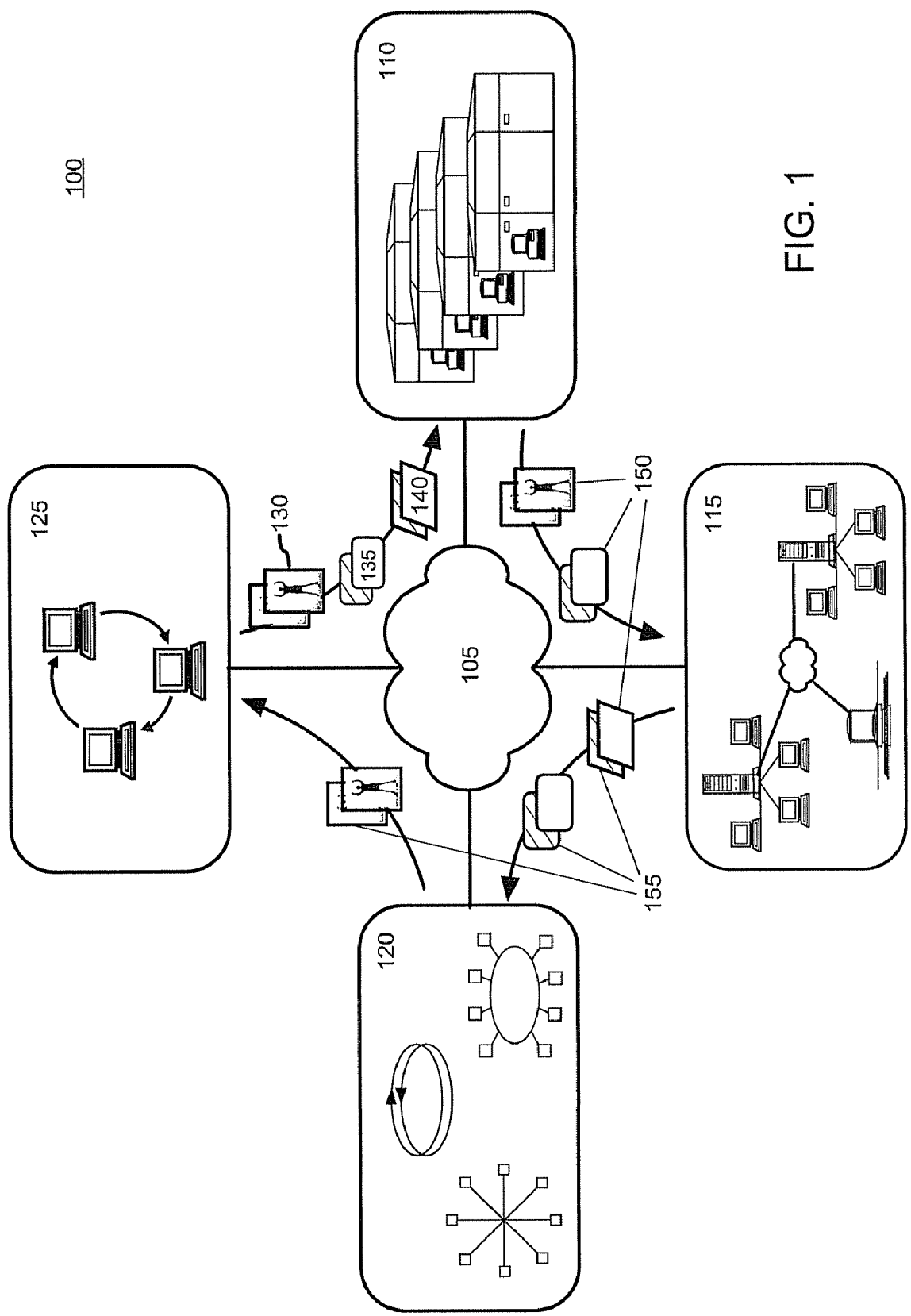
FIG. 1 is a schematic diagram illustrating an exemplary grid environment enabled for ghost agents and host processes in accordance with the inventive arrangements disclosed herein.

FIG. 1 is a schematic diagram illustrating an exemplary grid environment 100 enabled for ghost agents and host processes. The grid environment 100 can be a distributed shared computing environment where a pool of computing resources are accessible on an as needed basis by a multitude of applications, users, and organizations. That is, within the grid computing environment 100 computing resources can be treated as commodities in a fashion similar to other consumer commodities, such as electricity and water.

The grid environment 100 infrastructure can include components that utilize any hardware platform, operating system, storage scheme, and software resource. In order to be integrated within the grid environment 100, each computing component can be communicatively linked to the grid environment 100 and can follow the standards and protocols that define the architecture of the grid environment 100. The grid environment 100 can include one or more grids, such as grids 110, 115, 120, and 125, communicatively linked to one another through a network 105. Each grid can represent a grouping of physically differentiable hardware resources. Users, applications, and processes utilizing the grid environment 100 can utilize computing resources produced by hardware residing within one or more grids.

The network 105 can communicatively link the various computing components that form the grid environment 100. The network 105 can utilize any communication medium to facilitate information exchange within the grid environment including, but not limited to, wireless pathways, line-based pathways, satellite pathways, and line-of site pathways. Moreover, the network 105 can include global networks, local networks, and stand-alone computing devices. For example, the network 105 can include the Internet, intranets, and other sub-networks. Additionally, the network 105 can include mainframes, personal computers, personal data assistants, cellular telephones, land-based telephones, networked peripherals, and other hardware. Communication over the network 105 can be based upon circuit-switched methodologies, packet-switched methodologies, any combination of the circuit-switched and packet-switched methodologies, in addition to any other communication methodology through which computing resources can be exchanged.

The grid 110 can include a multitude of mainframe or supercomputers. Grids designed primarily for computing power, often called computational grids, typically contain one or more supercomputers. Another exemplary grid, the grid 115 can include several local area networks, workgroups, and computing arrays. Grids including resources from dispersed local area networks that can be loosely or tightly integrated to one another are often referred to as scattered grids.

The grid 120 is yet another exemplary grid that can include computing resources arranged according to any topography including, but not limited to, star topographies, Fiber Distributed Data Interface (FDDI) rings, token rings, and the like. Organized and redundant topographies are often used to store essential data in a redundant fashion so that single points of failure do not result in system outages. Grids designed primarily for data storage and retrieval are often called data grids.

The grid 125 is still another exemplary grid that can include one or more peer-to-peer networks. The peer-to-peer networks can be secured and/or unsecured networks. It should be noted that any type of grid can be included in the grid environment and that grids 110, 115, 120, and 125 are merely illustrative examples of possible grids. One of ordinary skill in the art can appreciate that the invention is not to be limited in this regard, that any hardware resources, topography, and software can be included in the grid environment 100, and that such arrangements are contemplated herein.

Software objects called host software objects 150 can traverse the various grids 110, 115, 120, and 125 of the grid environment and execute actions therein. Host software objects 150 can include such objects as user objects 130, applications 135, and processes 140. Each type of host software object 150 can move from grid to grid within the grid environment 100 and can move within a grid of the grid environment 100.

Each user object 130 can represent an identity of an entity logged into the grid environment 100 including, but not limited to, users, categories of users, companies, organizations, and virtual organizations. The user object 130 can execute actions responsive to requests. For example, the user object 130 can convey user requests to suitable components within the grid environment 100, receive request responses, and provide the request responses to the user.

Each application 135 can represent a software unit configured to perform a group of related actions. In one arrangement, the application 135 can be functionally directed towards a particular set of tasks. For example, the application 135 can be a word processing application configured to perform tasks relating to textual electronic documents such as editing, storing, searching, proofreading, translating, transcribing, formatting, and the like. In a different functional example, the application 135 can be an interactive voice response (IVR) application configured to automatically provide customer related services.

In another arrangement, the application 135 can include a set of structurally related software objects and corresponding methods. For example, the application 135 can represent a region or realm within a Massive Multi-Player Gaming (MMPG) system. In a different structural example, the application 135 can represent the set of components that form a virtual machine executing within the grid environment 100.

Each process 140 can represent a software object configured to perform a specific task. For example, processes 140 can include a directory lookup task, a spell check task, a text-to-speech conversion, a data search, determining a word count, and the like. Each process 140 can also represent a particular software object and corresponding methods. For example, the process 140 can represent a particular weapon within a MMPG system. Appreciably, one application 135 can include a multitude of processes 140. Similarly, one user object 130 can utilize several processes 140.

Each host software object 150 can have an associated ghost agent 155. The ghost agent 155 can replicate the actions of the host software object 150 and follow the host software object 150 from grid to grid. The actions replicated within the ghost agent 155 can be recorded or logged. In one embodiment, the replicated actions within the ghost agents can be passive actions that are prevented from executing within the grid environment 100. Accordingly, from the perspective of the grid environment 100, passive actions can be handled as if they were "read-only" actions or actions that do not result in operational changes within the grid environment 100. In an alternate embodiment, the ghost agents 155 can generate active actions that are operationally executed within the grid environment 100.

It should be noted that if a statistically relevant number of ghost agents 155 are included within the grid environment 100, the behavior of the grid environment 100 can be modeled. For example, if one fifth of the users of the grid environment 100 is a statistically relevant quantity for modeling purposes, then grid environment 100 can be modeled by associating a ghost agent 155 to one out of every five user objects 130. Similarly, if one sixth of the applications 135 are a statistically relevant quantity for modeling purposes, then the grid environment 100 can be modeled by associating a ghost agent 155 to one out of every six applications 135.

One illustrative example of ghost agents 155 operating within a grid environment 100 can relate to a MMPG system. Players within the MMPG system can each represent a user object 130. While playing the MMPG, players can move from one game play area to another, thereby moving from one grid to another within the grid environment 100. Ghost agents 155 can be attached to selected players. For example, a MMPG developer implementing a new guild or organization that players can join can attach ghost agents 155 to a portion of players belonging to the guild so that guild related behavior can be examined. The ghost agents 155 can record the actions of associated players regardless of which grid a player utilizes. The recorded actions of the monitored players can be conveyed by the ghost agents 155 to a centralized network location configured to log player activities.

Similarly, a ghost agent 155 can record actions relating to a particular object within the MMPG system, such as a weapon. The ghost agent 155 can be associated with whatever player currently possesses the weapon and can record only weapon specific actions. If the weapon is conveyed from one player to another, the ghost agent 155 can automatically disassociate itself with the first player and re-associate itself with the player now possessing the weapon. The ghost agent can convey the recorded actions relating to the weapon to a centralized location configured to log actions pertaining to game items. Of course, the above MMPG example is just one possible application within which ghost agents 155 can be utilized and the invention is not limited in this regard.

Figure 2:
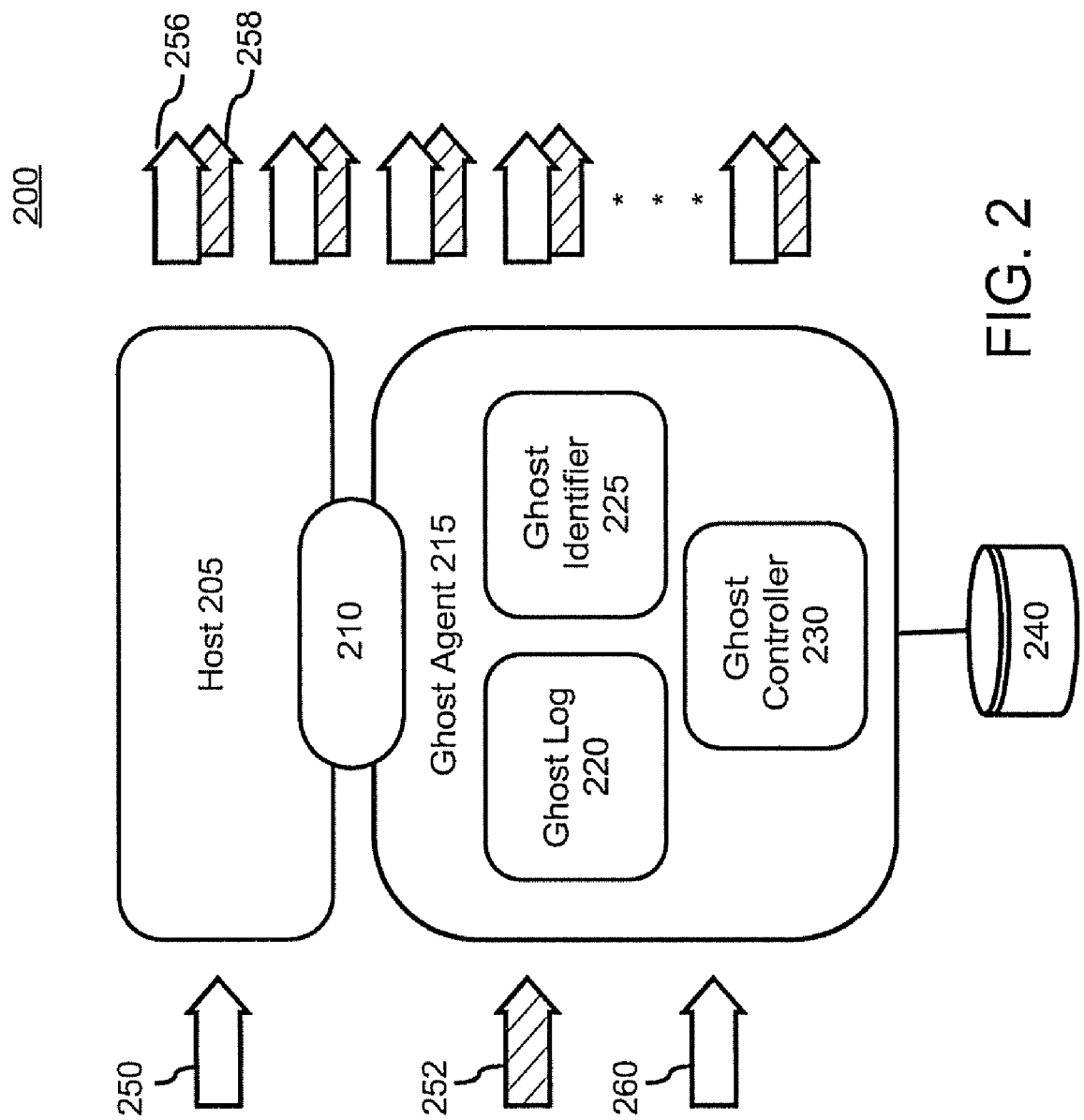
FIG. 2 is a schematic diagram detailing a host software object and a ghost agent within a grid environment in accordance with the inventive arrangements described herein.

FIG. 2 is a schematic diagram detailing a host software object 205 and a ghost agent 215 within a grid environment 200 in accordance with the inventive arrangements described herein. The host software object 205 can be any definable software unit within the grid environment 200 that can receive host input 250 and execute host actions 256. For example, the host software object 205 can include, but is not limited to, a user object, an application, and a process.

The ghost agent 215 can be a passive or active software object that can be associated with a host software object 205 and replicate message flows received from and performed by the host software object 205. The ghost agent 215 can copy the host input 250 received by the host software object 205, thereby creating ghost input 252. The ghost agent 215 can also replicate the host actions 256 performed by the host software object 205, wherein the replicated actions can be referred to as ghost actions 258. The only manner that the host software object 205 is generally affected by the ghost agent 215 is by having the message flows of the host software agent 205 replicated; operation of the host software agent 205 is typically not impaired. Consequently, the relationship between the host software object 205 and the ghost agent 215 can be considered a passive one.

The ghost agent 215 can include a ghost log 220, a ghost identifier 225, and a ghost controller 230. The ghost log 220 can record the ghost input 250 and ghost actions 258, thereby creating a log. The ghost log 220 can be configured to record all activities relating to the associated host software object 205 or can be configured to record only selected activities. For example, in one embodiment, the ghost log 220 can be configured to record only activities considered errors, thereby generating an error log. In another example, the ghost log 220 can record a statistically relevant portion of actions, such as recording every fifth ghost input 252 and corresponding ghost actions 258. The ghost log 220 can also capture system information and add annotations from this system information to the generated log. For example, system clock information can be captured and used to annotate the time between receiving a ghost input 252 and a generating ghost actions 258.

In another example, metadata information contained within message flows, such as host input 250, ghost input 252, host action 256, and ghost action 258, can be utilized by the ghost log 220. Additionally, the ghost log 220 can time stamp actions recorded within the ghost agent 215.

The ghost log 220 can also record the log information in a ghost log repository 240. The ghost log repository 240 can be any memory space either internal to the ghost agent 215 or external of the ghost agent 215. If the ghost log repository 240 is external to the ghost agent 215, any of a variety of different mechanisms can be utilized to convey the log data to the ghost log repository 240.

For example, an intermittent communication link, such as a unicast or a point-to-point communication link, can be established between the ghost log 220 and the ghost log repository 240 through which data can be conveyed. In another example, a buffer space within the ghost agent 215 can record log information. Whenever the buffer reaches a specified volume of data, a message containing the buffered information can be conveyed to the ghost log repository 240 and the buffer within the ghost agent 215 can be cleared and used to store fresh data.

In yet another example, ghost agents 215 can convey log data to a local data server. The local data server can then convey all received log data to the ghost log repository 240 from time to time. In still another example, the ghost agent 215 can intermittently deposit log data to a local location. Then a data-reaping object can gather packets of the log data that have been locally deposited by the various ghost agents 215. The packets of log data can be conveyed to the ghost log repository 240 by the data-reaping objects.

The ghost identifier 225 can provide identification, authorization, and security related functions for the ghost agent 215. That is, the ghost identifier 225 can identify the ghost agent 215 to the various components of the grid environment 200. Accordingly, the components of the grid environment 200, which include grid servers as well as grid and network management systems, can have an awareness of the ghost agent 215. The grid servers can then use policy-based controls to manage permissions, authentication, resource utilization, and security for the ghost agents 215. Ghost agents 215 adhering to the established policies can be permitted to automatically enter and exit the various grids of the grid environment 200.

In one embodiment, a ghost agent 215 can replicate the passwords provided by the host software object 205 and receive the same system permissions and access as the host software object 205. In another embodiment, different permission levels can be established for the host software object 205 and the associated ghost agent 215. For example, the host software object 205 can be granted privileges to execute actions within the grid environment 200 while a restriction against executing actions can be placed upon the ghost agent 215. In another example, before a ghost agent 215 can be permitted to follow an associated host software object 205 from one grid in the grid environment 200 to the next, a password or digital certificate unique to the ghost agent 215 can be required. Moreover, the ghost agent 215 can be granted different access privileges to computing resources as the ghost agent 215 traverses from one grid in a grid environment 200 to another depending on grid-based policies.

The ghost controller 230 can manage the ghost agent 215. For example, the ghost controller 230 can establish a life span for a particular ghost agent 215 so that the ghost agent 215 self-terminates after a designated period. In another example, the ghost controller 230 can restrict the computing resources consumed by the ghost agent 215, thereby freeing up system resources in the grid environment 200 for improved operational performance. Alternately, the ghost controller 230 can increase the computing resource consumed by the ghost agent 215, thereby slowing down operational performance in the grid environment 200. Slowing performance can be beneficial when simulating system load during testing.

In one embodiment, the ghost controller 230 can accept control signals 260 from an external source. For example, the ghost controller 230 can receive control signals 260 causing the ghost agent 215 to alter previously designated behavior. Further, the ghost controller 230 can include a listener object capable of responding to particular events broadcasted by a corresponding notifier object. For example, a server could broadcast a signal causing all ghost controllers 230 to limit the resource consumption of all ghost agents 215 presently disposed in the server. Similarly, a grid wide broadcast could cause specified ghost agents 215 to self-terminate.

A ghost interface 210 can be used to associate or bind the ghost agent 215 with the host software object 205 using any suitable technique. For example, techniques used by software debugging programs to attach monitors to running programs in order to evaluate system behavior and step through code can be used by the ghost interface 210 to bind the ghost agent 215 with the host software object 205. Additionally, techniques used by system calibration and hardware performance testing utilities can be used to bind the ghost agent 215 with the host software object 205. Further, operating systems commands and tools, such as the UNIX commands "strace" and "ptrace," can potentially be used by the ghost interface 210 to bind the host software object 205 with the ghost agent 215.

It should be noted that the ghost actions 258 are not necessarily transmitted by the ghost agent 215 into the grid environment 200 in the same manner that the host actions 256 are transmitted. For example, when the ghost agent 215 is a passive software object, the ghost actions 258 can be prevented from executing with the operational environment. Accordingly, the ghost actions 258 can be internal to the ghost agent 215 as opposed to being transmitted by the ghost agent 215.

In another example, when the ghost agent 215 is an active software object, the ghost actions 258 can be transmitted into the grid environment 200 to be operationally executed. For instance, the ghost action 258 can be identified by the grid environment 200 as a ghost action 258. The ghost action 258 can then be directed to a test environment, as opposed to an operational environment, in order to prevent duplicative actions from being operationally performed.

Figure 3:
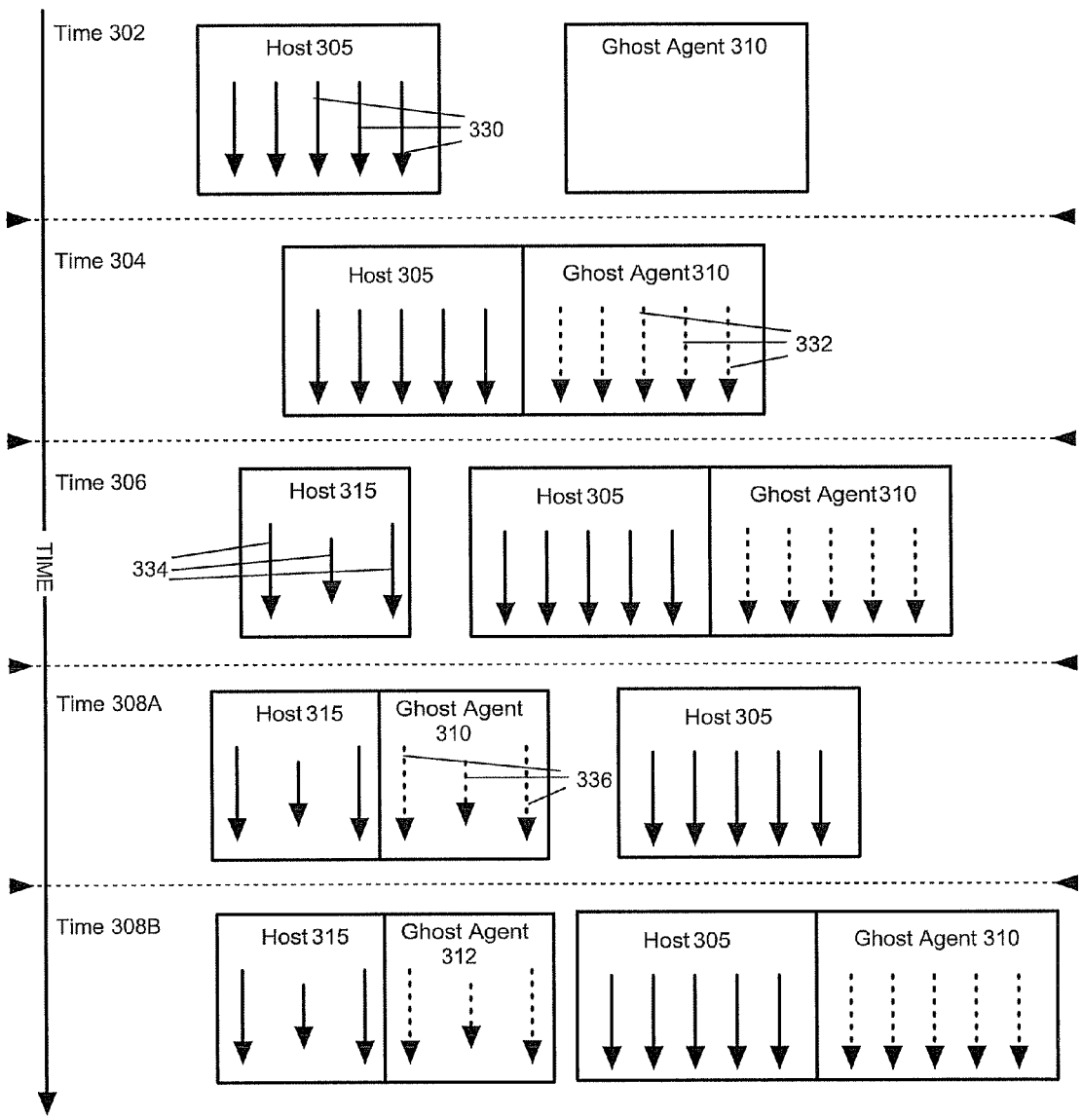
FIG. 3 is a schematic diagram illustrating the interaction between hosts and ghost agents over time in accordance with inventive arrangements disclosed herein.

FIG. 3 is a schematic diagram illustrating the interaction between hosts and ghost agents over time in accordance with inventive arrangements disclosed herein. The interaction can begin at time 302 with an unassociated ghost agent 310 and a host software object 305 executing host actions 330. At time 304, the ghost agent 310 can associate itself with the host software object 305. During this association process, each host action 330 within the host software object 305 can be replicated within the ghost agent 310 as a ghost action 332. Further, anytime a new action is initiated within the host software agent 310, the new action can be replicated within the associated ghost agent 310.

Each ghost action 332 can be either a passive or an active action. For example, the host actions 330 can be executed within the grid environment while the ghost actions 332 can be passive actions that are operationally disabled. Passive actions are those actions, which do not affect the operational behavior of the host software agent 305.

In another arrangement, the ghost actions 332 can be active actions affecting the operational performance of the environment and/or the associated host software agent 305. For instance, a ghost action 332 can consume limited computing resources thereby inducing a delay into the system and potentially slowing down system response time for the corresponding host software object 305. Delays induced by ghost actions 332 can be tailored by changing the execution details of the instruction set described within individual ghost actions 332.

For example, if a host action 330 includes code containing a "for loop" that cycles fifty times, the originally copied ghost action 332 can also contain a "for loop" that cycles fifty times. The ghost agent 310 can increase the number of cycles in the "for loop" to some number greater than fifty to slow down processing time and can decrease the cycles to a number less than fifty to speed up processing time.

At time 306, an interaction between host software object 305 and host software object 315 executing actions 334 can occur. This interaction can trigger either a transfer of the ghost agent 310 or a cloning of the ghost agent 310, wherein time 308A illustrates the results of an exemplary transfer action and time 308B illustrates the results of an exemplary cloning action.

At time 308A, the ghost agent 310 can be transferred from host software object 305 to host software object 315. For example, the ghost agent 310 can be first disassociated with host software object 305. The disassociation causes the ghost agent 310 to stop replicating actions of the host 305. Then the ghost agent 310 can be associated with host software object 315. During the association, the actions 334 can be replicated within ghost agent 310 resulting in ghost actions 336. Accordingly, the actions now recorded by the ghost agent 310 and placed within a ghost log repository are based upon host software object 315 and are not based upon host software object 305. In another example, the ghost agent 310 can be replicated and attached to the host software agent 315. Once replicated, the original ghost agent 310 associated with the host software object 305 can be deleted.

At time 308B, the ghost agent 310 can be cloned resulting in the creation of ghost agent 312, which is a copy of ghost agent 310. Ghost agent 312 is then associated with host 315. During the association, the actions 334 can be replicated within ghost agent 312. Accordingly, the actions for both host software object 305 and host software object 315 can be recorded by ghost agents and thereafter placed in the ghost log repository for logging purposes.

It should be noted that ghost agents 310 and 312 can be self-managing, self-identifying software objects capable of performing predefined tasks in a self-sufficient manner. For example, the ghost agents 310 and 312 can be programmed to seek a host software object of a specified type, to track a desired host software object from one grid location to another within a grid environment, to move from one grid in a grid environment to another, and/or to associate with host software objects. In another example, the ghost agents 310 and 312 can be programmed to clone and attach themselves whenever a predetermined condition occurs, such as whenever a user object of a particular type is encountered.

The ghost agents 310 and 312 can also exchange information between themselves. For example, ghost agent 310 and ghost agents 312 can convey messages, records, and individual replicated actions to each other. Notably if ghost agent 310 and ghost agent 312 are disposed in different grids and if each wanted to move to the other's grid, the swapping of information between the two ghost agents 310 and 312 can be performed in lieu of moving each ghost agent.

In particular embodiments, each grid in a grid environment can contain a number of "blank" ghosts. "Movement" of a ghost from a first grid to a second grid can actually be performed by transferring the information from the "moving" ghost in the first grid to the "blank" ghost in the second grid. The "moving" ghost, now emptied of content, can be treated as a "blank" ghost for the first grid.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A non-transitory computer-readable storage medium in a grid computing environment, comprising computer instructions for configuring a ghost software object associated with a host software object operating within said grid environment, said ghost software object comprising:
   a ghost log configured to record activities of said host software object;
   a ghost identifier configured to identify said ghost software object to components within said grid environment; and,
   a ghost controller for determining a statistically relevant number of ghost agents in said grid environment, modeling delays associated with the statistically relevant number of ghost agents executing ghost software objects consuming limited computing resources in the grid environment, and managing interactions between said ghost software object that consume the limited computing resources inducing the delays and components external to said ghost software object by triggering either a transfer of the ghost software object or a cloning of the ghost software object in view of passive and active interactions consuming the limited computing resources, wherein said ghost software object can automatically move within said grid environment responsive to predetermined conditions relating to said host software object.

2. The computer-readable storage medium of claim 1, wherein, wherein said host software object represents an application within said grid environment.

3. The computer-readable storage medium of claim 1, wherein, wherein said host software object represents a process performed within said grid environment.

4. The computer-readable storage medium of claim 1, wherein, wherein at least one of the plurality of computing resources comprises a ghost log repository, said repository comprising a data store configured to receive log messages from a plurality of ghost agents.

5. The computer-readable storage medium of claim 1, wherein, wherein a ghost interface is configured to bind said ghost agent to said host software object.

6. The computer-readable storage medium of claim 1, wherein said host software object represents a user of said grid environment.

7. The computer-readable storage medium of claim 1, wherein said ghost software object is linked with said host software object in response to a command executed in said grid environment, and the ghost controller either restricts computing resources consumed by ghost agents, thereby freeing up system resources in the grid environment for improved operational performance, or increases the computing resource consumed by ghost agents, thereby slowing down operational performance in the grid environment in view of passive and active interactions between the ghost software and the host software object.

8. The computer-readable storage medium of claim 1, wherein said ghost software object is disassociated with said host software object and linked with a different host software object in response to one or more commands executed in said grid environment.

9. A non-transitory computer-readable storage having stored thereon, a computer program having a plurality of code sections, said code sections executable by a computer for causing the computer to perform the steps of:
   determining a statistically relevant number of ghost agents in said grid environment;
   modeling delays associated with the statistically relevant number of ghost agents executing ghost software objects consuming limited computing resources in the grid environment;
   identifying a host software object operating in one grid;
   selecting an existing blank ghost software object within the one grid;
   associating said blank ghost software object with said host software object;
   in response to said associating of said blank ghost software object, configuring said blank ghost software object to replicate and record at least one action of said host software object;
   identifying an interaction between said ghost software object and said host software object, wherein the interaction consumes the limited computing resources and induces the delays;
   triggering either a transfer of the ghost software object or a cloning of the ghost software object in view of the interaction and the delays,
   moving said host software object from the one grid to another grid; and,
   in response to said moving of said host software object, moving said configured ghost software object from said one grid to said another grid.

10. The computer-readable storage of claim 9, wherein said host software object comprises a user object.

11. The computer-readable storage of claim 10, wherein said user object represents a player of a distributed multi-player gaining system, and wherein said configured ghost software object is further configured to record actions taken by a user represented by said user object within said distributed multi-player gaming system.

12. The computer-readable storage of claim 9, wherein said configured ghost software object is passive, said computer-readable storage further comprising the step of:
   preventing said at least one replicated action by said configured ghost software object from executing.

13. The computer-readable storage of claim 9, further comprising code sections executable by the computer for causing the computer to perform the steps of:
   determining a location for logging data that is external to said configured ghost software object; and,
   conveying said at least one replicated and recorded action to said determined location.

14. The computer-readable storage of claim 9, further comprising code sections executable by the computer for causing the computer to perform the steps of:
   authenticating said configured ghost software object within said another grid; and,
   enabling said configured ghost software object to automatically enter said another grid based upon said authenticating step.

15. The computer-readable storage of claim 9, further comprising code sections executable by the computer for causing the computer to perform the steps of:
   generating a new action within said host software object; and,
   replicating said new action within said configured ghost software object.

16. The computer-readable storage of claim 9, further comprising code sections executable by the computer for causing the computer to perform the steps of:
   selecting a plurality of host software objects;
   for each one of the selected plurality of host software objects, repeating said identifying, said selecting, said associating step and said moving steps; and,
   modeling behavior of at least a part of said grid environment using data obtained from a plurality of configured ghost software objects associated with said selected plurality of host software objects.

17. The computer-readable storage of claim 9, further comprising code sections executable by the computer for causing the computer to perform the steps of:
   disassociating said configured ghost software object from said host software object; and,
   associating said disassociated configured ghost software object with a different host software object.

18. The computer-readable storage of claim 9, further comprising code sections executable by the computer for causing the computer to perform the steps of:
   creating a cloned ghost software object, wherein said cloned ghost software object is a copy of said configured ghost software object; and,
   associating said cloned ghost software object with a different host software object.

* * * * *